United States Patent [19]

Williams et al.

[11] Patent Number: 5,487,352
[45] Date of Patent: Jan. 30, 1996

[54] TEMPERATURE INDICATOR FOR COOKED MEATS

[75] Inventors: John R. Williams, 3301 Providence, Apt. 608, Bryan, Tex. 77803; Melvin T. Jacobs, Fort Smith, Ark.

[73] Assignee: John R. Williams, Bryan, Tex.

[21] Appl. No.: 309,941

[22] Filed: Sep. 21, 1994

[51] Int. Cl.⁶ .............................. G01K 1/02; G01K 11/00
[52] U.S. Cl. ......................... 116/218; 116/217; 374/160
[58] Field of Search ................................. 116/206, 207, 116/216, 217, 218; 374/155, 160

[56] References Cited

U.S. PATENT DOCUMENTS

| | | |
|---|---|---|
| 945,978 | 1/1910 | Nielsen et al. . |
| 1,147,483 | 7/1915 | Clark . |
| 1,251,745 | 1/1918 | Bowers . |
| 1,280,631 | 10/1918 | Atkinson . |
| 1,387,890 | 8/1921 | Kleidman . |
| 1,441,307 | 1/1923 | Swanberg . |
| 1,443,786 | 1/1923 | Dolph . |
| 1,450,769 | 4/1923 | Crosby . |
| 1,476,864 | 12/1923 | West . |
| 1,748,330 | 2/1930 | Corey . |
| 1,802,231 | 4/1931 | Blondin . |
| 1,836,601 | 12/1931 | Key . |
| 1,916,989 | 7/1933 | Rader et al. . |
| 2,139,682 | 12/1938 | Hothersall . |
| 2,335,999 | 12/1943 | Diack . |
| 2,362,398 | 11/1944 | Pittman . |
| 2,363,711 | 11/1944 | Walsh . |
| 2,456,262 | 12/1948 | Fields . |
| 2,460,215 | 1/1949 | Chase . |
| 2,472,266 | 6/1949 | Quellette . |
| 2,532,844 | 12/1950 | Hulbert, Sr. et al. . |
| 2,662,018 | 12/1953 | Smith . |
| 2,677,278 | 5/1954 | Smith et al. . |
| 2,694,997 | 11/1954 | Alger, Jr. . |
| 2,781,552 | 2/1957 | Gray . |
| 2,799,167 | 7/1957 | Loconti . |
| 2,805,575 | 9/1957 | Fredericks . |
| 2,856,885 | 10/1958 | Huyck et al. . |
| 2,856,930 | 10/1958 | Huyck et al. . |
| 2,873,609 | 2/1959 | Von Wangenheim . |
| 2,889,799 | 6/1959 | Korpman . |
| 2,915,405 | 12/1959 | Hammond, Jr. et al. . |
| 2,948,151 | 8/1960 | Astl . |
| 2,957,205 | 10/1960 | Barber et al. . |
| 3,001,401 | 9/1961 | Vernet et al. . |
| 3,002,385 | 10/1961 | Wahl et al. . |
| 3,020,874 | 2/1962 | Bruce et al. . |
| 3,032,825 | 5/1962 | Proud . |
| 3,046,786 | 7/1962 | Tessem . |
| 3,082,624 | 3/1963 | Renier . |
| 3,090,235 | 5/1963 | Houser . |
| 3,090,236 | 5/1963 | Nicol . |
| 3,140,611 | 7/1964 | Kliewer . |
| 3,170,236 | 2/1965 | Massingill . |
| 3,198,866 | 8/1965 | Covington, Jr. et al. . |
| 3,242,733 | 3/1966 | Johnson . |
| 3,280,629 | 10/1966 | Kliewer . |
| 3,290,942 | 12/1966 | Carbaugh et al. . |
| 3,324,723 | 6/1967 | Ritchie et al. . |
| 3,382,840 | 5/1968 | Pabst . |
| 3,394,572 | 7/1968 | Van Allman . |
| 3,410,939 | 11/1968 | Driza et al. . |
| 3,420,205 | 1/1969 | Morison . |
| 3,427,992 | 2/1969 | Jones et al. . |
| 3,479,876 | 11/1969 | Kliewer . |
| 3,479,877 | 11/1969 | Allen et al. . |
| 3,548,780 | 12/1970 | Kliewer . |
| 3,559,615 | 2/1971 | Kliewer . |
| 3,626,897 | 12/1971 | Kliewer . |
| 3,656,452 | 4/1972 | Kliewer . |

(List continued on next page.)

*Primary Examiner*—William A. Cuchlinski, Jr.
*Assistant Examiner*—Andrew Hirshfeld
*Attorney, Agent, or Firm*—Pravel, Hewitt, Kimball & Krieger

[57] ABSTRACT

A temperature indicator including a barrel and shaft wherein the shaft has a number of integrally formed, longitudinally spaced seals which engage the internal bore of the barrel in order to keep the bore of the barrel sealed from any incursion of cooking juices into the barrel and from the outflow of any melted temperature sensitive material.

7 Claims, 1 Drawing Sheet

U.S. PATENT DOCUMENTS

| | | |
|---|---|---|
| 3,682,130 | 8/1972 | Jeffers . |
| 3,693,579 | 9/1972 | Kliewer . |
| 3,724,360 | 4/1973 | Kliewer et al. . |
| 3,779,080 | 12/1973 | Smith . |
| 3,811,402 | 5/1974 | Keeley et al. . |
| 3,820,499 | 6/1974 | Kliewer et al. . |
| 3,965,849 | 6/1976 | Gee . |
| 3,981,683 | 9/1976 | Larsson et al. . |
| 3,996,802 | 12/1976 | Smith . |
| 3,998,098 | 12/1976 | Chilton . |
| 4,006,414 | 2/1977 | Parker . |
| 4,011,552 | 3/1977 | Quirke . |
| 4,016,762 | 4/1977 | Payne . |
| 4,022,148 | 5/1977 | Chapman . |
| 4,035,787 | 7/1977 | Hornung . |
| 4,036,166 | 7/1977 | Fleming . |
| 4,038,510 | 7/1977 | White . |
| 4,044,707 | 8/1977 | Byrne . |
| 4,058,013 | 11/1977 | Trott . |
| 4,059,997 | 11/1977 | Trott . |
| 4,072,055 | 2/1978 | Elliott . |
| 4,077,260 | 3/1978 | Gray et al. . |
| 4,081,645 | 3/1978 | Javes et al. . |
| 4,082,000 | 4/1978 | Volk . |
| 4,083,250 | 4/1978 | Goff et al. . |
| 4,083,364 | 4/1978 | Kelly et al. . |
| 4,088,863 | 5/1978 | Jellies . |
| 4,089,222 | 5/1978 | Perkins . |
| 4,092,625 | 5/1978 | Newsom . |
| 4,101,343 | 7/1978 | Feichter et al. . |
| 4,114,443 | 9/1978 | Clark . |
| 4,118,667 | 10/1978 | Milligan . |
| 4,121,533 | 10/1978 | Pappas et al. . |
| 4,122,322 | 10/1978 | Ohkubo et al. . |
| 4,130,083 | 12/1979 | Bouchard et al. . |
| 4,137,769 | 2/1979 | Parker . |
| 4,138,889 | 2/1979 | Fraschini . |
| 4,143,617 | 3/1979 | Youngren . |
| 4,145,918 | 3/1979 | Couth et al. . |
| 4,149,056 | 4/1979 | Kaneshiro et al. . |
| 4,154,106 | 5/1979 | Inoue et al. . |
| 4,170,956 | 10/1979 | Wear . |
| 4,212,004 | 7/1980 | Bensemann . |
| 4,217,477 | 8/1980 | Matsubara et al. . |
| 4,220,300 | 9/1980 | Reicher et al. . |
| 4,230,731 | 10/1980 | Tyler . |
| 4,260,023 | 4/1981 | Irmscher . |
| 4,280,508 | 7/1981 | Barrada . |
| 4,289,088 | 9/1981 | Scibelli . |
| 4,291,576 | 9/1981 | Deane . |
| 4,299,727 | 11/1981 | Hof . |
| 4,314,596 | 2/1982 | Keresztes . |
| 4,318,077 | 3/1982 | Bubnich et al. . |
| 4,325,217 | 4/1982 | Golestanih . |
| 4,333,339 | 6/1982 | McNeely et al. . |
| 4,339,207 | 7/1982 | Hof . |
| 4,353,990 | 10/1982 | Manske et al. . |
| 4,356,790 | 11/1982 | Gee . |
| 4,365,643 | 12/1982 | Masclet et al. . |
| 4,377,733 | 3/1983 | Yamaguchi et al. . |
| 4,381,439 | 4/1983 | Miyazawa et al. . |
| 4,385,844 | 5/1983 | Fergason . |
| 4,390,291 | 6/1983 | Gaven, Jr. et al. . |
| 4,408,904 | 10/1983 | Tokarz . |
| 4,410,283 | 10/1983 | Dubois et al. . |
| 4,421,053 | 12/1983 | Volk . |
| 4,445,788 | 5/1984 | Twersky et al. . |
| 4,448,548 | 5/1984 | Foley . |
| 4,457,252 | 7/1984 | Manske . |
| 4,457,253 | 7/1984 | Manske . |
| 4,468,137 | 8/1984 | Hilsum et al. . |
| 4,475,024 | 10/1984 | Tateda . |
| 4,488,822 | 12/1984 | Brennan . |
| 4,509,449 | 4/1985 | Chalmers . |
| 4,513,750 | 4/1985 | Heyman et al. . |
| 4,516,520 | 5/1985 | Whaley . |
| 4,518,839 | 5/1985 | Taguchi et al. . |
| 4,522,219 | 6/1985 | Ohkata . |
| 4,523,605 | 6/1985 | Ohkata . |
| 4,530,659 | 7/1985 | Wright . |
| 4,561,300 | 12/1985 | O'Brien . |
| 4,563,973 | 1/1986 | Stull et al. . |
| 4,580,909 | 4/1986 | McIntosh . |
| 4,610,552 | 9/1986 | Kobayashi et al. . |
| 4,612,872 | 9/1986 | Welchel et al. . |
| 4,617,441 | 10/1986 | Koide et al. . |
| 4,653,973 | 3/1987 | Scholz . |
| 4,664,056 | 5/1987 | Jehanno . |
| 4,679,157 | 7/1987 | Hirano et al. . |
| 4,729,671 | 3/1988 | Asano et al. . |
| 4,743,120 | 5/1988 | Bowen . |
| 4,744,671 | 5/1988 | Bowen . |
| 4,747,712 | 5/1988 | Gonoh et al. . |
| 4,748,931 | 6/1988 | Volk . |
| 4,751,912 | 6/1988 | Monette . |
| 4,753,188 | 6/1988 | Schmoegner . |
| 4,767,219 | 8/1988 | Bibby . |
| 4,773,350 | 9/1988 | Lyons . |
| 4,773,767 | 9/1888 | Coll . |
| 4,782,617 | 11/1988 | Peikin et al. . |
| 4,788,871 | 12/1988 | Nelson et al. . |
| 4,793,717 | 12/1988 | Manske . |
| 4,818,119 | 4/1989 | Busch et al. . |
| 4,826,762 | 5/1989 | Klibanov et al. . |
| 4,832,599 | 5/1989 | Kung . |
| 4,850,716 | 7/1989 | Baker et al. . |
| 4,859,420 | 8/1989 | Schultz . |
| 4,866,997 | 9/1989 | Kaufman . |
| 4,893,477 | 1/1990 | Vazquez . |
| 4,932,429 | 6/1990 | Watanabe et al. . |
| 4,941,425 | 7/1990 | Holzer . |
| 4,947,786 | 8/1990 | Maynard et al. . |
| 4,962,765 | 10/1990 | Kung et al. . |
| 4,966,125 | 10/1990 | Stephen et al. . |
| 4,993,843 | 2/1991 | Toupin et al. . |
| 4,998,827 | 3/1991 | Holzer . |
| 4,999,615 | 3/1991 | Toupin et al. . |
| 5,033,865 | 7/1991 | Kuze . |
| 5,034,233 | 7/1991 | McCloy, Jr. . |
| 5,043,547 | 8/1991 | Lee . |
| 5,046,447 | 9/1991 | Steinke et al. . |
| 5,057,434 | 10/1991 | Prusik et al. . |
| 5,082,373 | 1/1992 | Rohde et al. . |
| 5,102,233 | 4/1992 | Staerk et al. . |
| 5,119,061 | 6/1992 | Kuze . |
| 5,120,137 | 6/1992 | Ou-Yang . |
| 5,129,731 | 7/1992 | Ballin . |
| 5,158,364 | 10/1992 | Labes . |
| 5,177,963 | 1/1993 | Kuze . |
| 5,195,841 | 3/1993 | Mullins . |
| 5,199,297 | 4/1993 | Lin et al. . |
| 5,203,278 | 4/1993 | Kinney . |

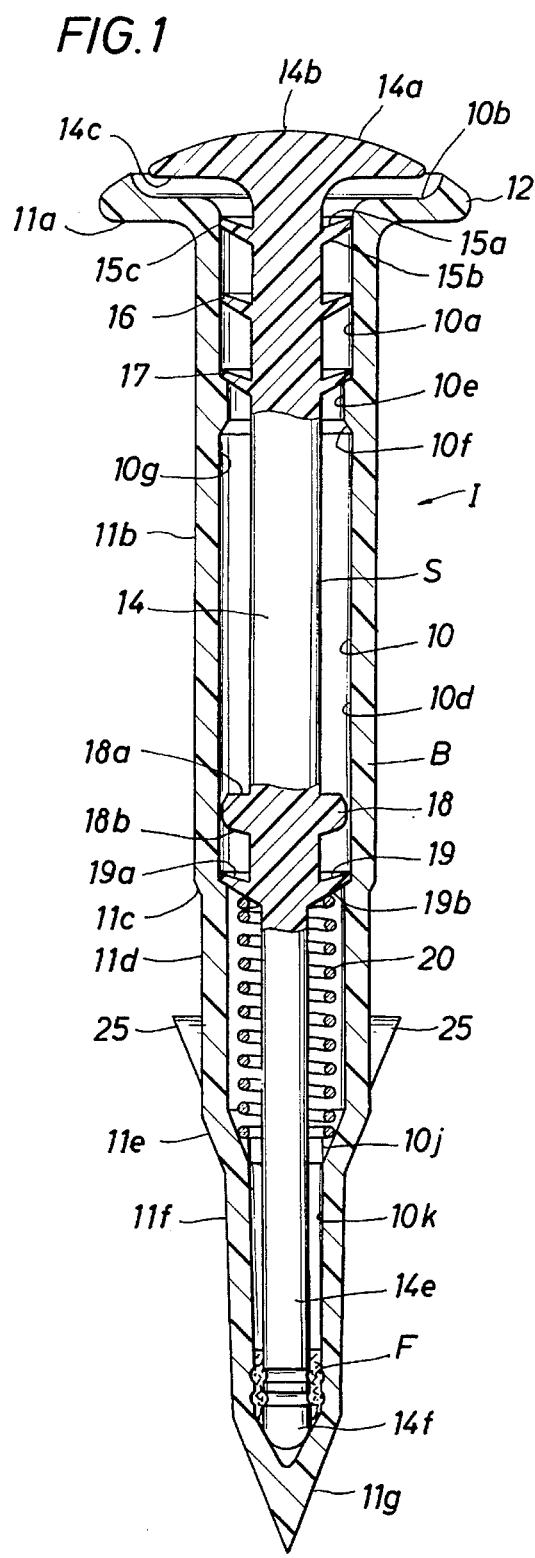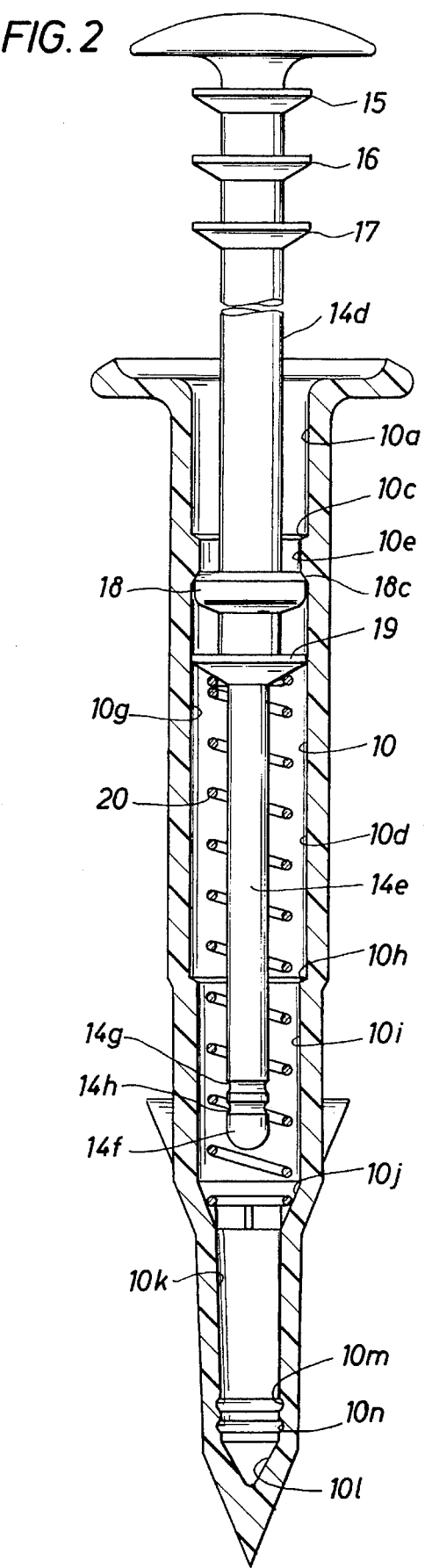

TEMPERATURE INDICATOR FOR COOKED MEATS

FIELD OF THE INVENTION

This invention relates to "pop-up" temperature indicators for cooked meats.

BACKGROUND OF THE INVENTION

Temperature indicators for cooked meats are well known in the art. Typically, such temperature indicators include an outer housing and an internal, centrally located and moveable stem. The stem is typically spring loaded and held in a withdrawn position by a solid, fusible material. Upon attainment of the desired temperature, the fusible material softens, allowing the force of the compressed spring to push the stem outward, thereby indicating that the desired temperature for the cooked meat has been obtained.

It is important that the stem be maintained within a closed environment so that the fusible material does not leak out of the timer and, vice versa, so that hot cooking juices do not enter the timer and prematurely soften the fusible material for release of the signal stem. One type of seal is disclosed in U.S. Pat. No. 4,748,931 of Volk, entitled "Umbrella Top Timer." The Umbrella Top Timer of Volk offers as a solution to the sealing problem the utilization of an enlarged flat outer end on the stem, which end extends radially outwardly of the stem and has an undersurface complementary to the upper surface on the outer housing or barrel flange for mating therewith to seal the interior of the barrel against the intrusion of foreign material such as hot cooking juices or fluids prior to release of the stem as the result of melting of the fusible material. In order for the enlarged flat outer end of the stem to engage the barrel flange, the stem must be inserted in proper alignment so that the necessary 360° sealing area can be effected. Any misalignment of the stem may cause the seal to be rendered ineffective.

SUMMARY OF THE INVENTION

It is an object of this invention to provide an improved temperature indicator or pop-up timer for cooked meats that includes a plurality of seals that self align to minimize the possibility of interchange of fluids between the meat and the temperature indicator.

BRIEF DESCRIPTION OF THE DRAWINGS

FIG. 1 is a side view, in section, of the temperature indicator of this invention illustrating the releasable stem in the contracted or withdrawn position; and FIG. 2 is side view, partly in section, illustrating the stem in a released position, which occurs upon the attainment of desired temperature within the cooked meat.

DETAILED DESCRIPTION OF PREFERRED EMBODIMENT

Referring to the drawings, FIGS. 1 and 2 illustrate the Temperature Indicator I of the preferred embodiment of this invention. The Temperature Indicator I is comprised of two principal components: an outer housing or barrel B and an inner shaft or stem S.

The outer housing or barrel B is a generally cylindrical housing, which is open at the upper end and converges to a point at its lower end so that the housing may be easily inserted into a meat which is to be cooked. Housing B includes a generally cylindrical internal bore 10 which may be divided into sections for purposes of discussion. The bore 10 includes a first internal, cylindrical section 10a which is formed integrally with an annular, frusto-conical, radially outwardly extending flanged portion 10b. The first internal bore section 10a includes a chamfered annular inwardly extending, upwardly facing shoulder 10c.

The second internal bore section 10d includes a cylindrical section 10e which joins the internally chamfered shoulder 10c. Section 10e is joined to an outwardly angled, downwardly facing, annular shoulder portion 10f, which joins to an elongated cylindrical wall portion 10g. The elongated cylindrical wall portion 10g has the same internal diameter as the cylindrical wall of the first bore section 10a. The second bore section 10d terminates in an inwardly extending chamfered, annular shoulder 10h.

The third bore section 10i includes a straight cylindrical wall section which terminates in an inwardly angled, gradually inclined shoulder portion 10j.

The fourth or final internal bore section 10k is generally cylindrical from its point of contact with inwardly sloping shoulder portion 10j and extends downwardly to terminate in a converging conically-shaped end portion 101. First and second annular recesses 10M and 10N are formed in the wall of the cylindrical portion 10K above the conically-shaped bore end portion 101.

The outer wall of the barrel B generally follows the internal contour just described. Referring now to the outer surface of the housing or barrel B, a radially extending outer surface 11a joins with the radial extension of the inner surface 10b to form the annular flange member 12. The outer surface of the barrel B further includes a first generally cylindrical section 11b, which joins the outer radially extending surface 11a and extends downwardly to an inwardly extending shoulder 11c. Shoulder 11c forms a cylindrical outer housing surface 11d of a slightly smaller diameter than the diameter of the cylindrical outer housing surface 11b. The cylindrical outer housing surface 11d extends downwardly and joins the inwardly, gradually inclined housing surface 11e, which itself joins the lower cylindrical housing surface 11f. The lower generally cylindrical housing surface 11f terminates in the outer conically-shaped, pointed end 11g so that the barrel B may be easily inserted into a meat to be cooked. A series of circumferentially spaced barbs 25 are designed to hold the indicator I within the meat after insertion.

The stem S is a generally elongated shaft 14 having at its upper end an enlarged, circular head portion 14a, which includes an upper rounded surface 14b and a lower, flat annular surface 14c, which joins an upper cylindrical shaft section 14d. The upper, generally cylindrical, stem or shaft section 14d includes three longitudinally spaced stem seals 15, 16 and 17. Each of the stem seals 15–17 are identical in structure and include an upwardly inclined, outwardly extending annular face 15a and a bottom inclined face 15b, which join in an annular, cylindrical sealing rim surface 15c, which sealingly engages the interior wall bore section 10a when the shaft is in the position of FIG. 1.

Further, a radially extending stop member or ring 18 is formed integrally with the shaft 14 on the upper generally cylindrical stem section 14d. The stop ring 18 includes an upper radially extending annular face 18a and a lower radially extending face 18b, which face curves into junction with the upper face 18a, which has a chamfered section 18c. The chamfered section 18c is moved into sealing engagement against the housing wall annular, downwardly facing shoulder 10f.

A final, lower shaft seal 19 is formed at the end of the upper stem shaft portion 14d. The radially extending seal 19 includes an upwardly inclined, outwardly extending upper surface 19a, which joins an inclined lower surface 19b. The inclined surface 19b joins the lower stem section 14e, which has a smaller diameter than the upper stem section 14d. The lower stem section 14e is a generally cylindrical section that terminates in a round lower end 14f. First and second internal annular recesses 14g and 14h are formed in the lower shaft portion 14e just above the bottom rounded end 14f.

Referring now to FIG. 1, which shows the Temperature Indicator in the contracted position, the stem S is shown inserted into the barrel B. In such inserted position, the bottom, rounded end 14f of the stem actually engages the conical sidewalls of barrel bore bottom 10l, thereby properly spacing or positioning the lower stem or shaft section 14e by centering the shaft section within the lower bore section 10k of the barrel B and further locating the entire shaft in a proper vertical position with the housing.

A fusible material generally designated as F is placed into the bottom bore portion 10l of the barrel even before the stem is inserted. With the fusible material F hardened, the aligned, internal annular recesses 14g and 14h in the stem, and annular recesses 10m and 10n in the bore of the barrel B, cooperate with a toroidal portion of solidified fusible material located in the recesses to maintain the stem S in the contracted or closed position.

The fusible material F can be any material that is non-toxic and softens and/or liquifies at the desired temperature. For example, alloys composed principally of bismuth are known to melt at the temperature considered appropriate for proper cooking of a turkey. Such alloys are available from Cerro Metal Products.

Referring again to the drawings, an internal coil spring 20 is positioned about the lower stem section 14e and is held in a contracted position between the lower internally inclined shoulder 10j of the barrel bore 10, and the lower inclined face 19b on seal ring portion 19. The coil spring 20 is held in the contracted position by the solidified, fusible material F located in the bottom of the barrel bore 10. It should be understood that the spring may be made of material other than metal, and that the spring may not be coiled but may be made of other material and in other configurations, so long as the spring is capable of being compressed and expanded in a resilient manner.

In this withdrawn or contracted position as shown in FIG. 1, the upper stem sealing rings 15–17 sealingly engage the internal cylindrical surface 10a of the barrel bore. In addition, the lower face of the stem seal ring 17 also engages the internal shoulder 10c of the bore 10a, such that both the annular outer or rim end surface and the bottom surface of the seal ring 17 are sealingly engaged against the barrel bore 10. In this manner, in the contracted position, the stem rings or seals 15, 16 and 17 provide four annular sealing areas to prevent the influx of hot cooking juices during the roasting or other cooking of the meat.

These juices are not sealed off by the stem head 14a, which is actually spaced from the barrel flange 12 even with the stem shaft 14 in the contracted or closed position of FIG. 1. As discussed earlier, such an annular seal is believed to be somewhat undesirable because of the lack of effectiveness of the seal if there is any misalignment between the stem and barrel. Here, the combination of the three stem sealing rings 15–17 in sealing engagement against the internal wall of the barrel bore section 10a and shoulder 10c provide a combination of four sealing areas, which also aid in proper alignment of the stem within the barrel.

With the stem 14 in the contracted position, the stem radial sealing portion or ring 19 engages both the cylindrical bore wall 10g and the radially inwardly extending shoulder 10h to provide two more sealing areas against the bore at this lower location. Once again, the utilization of a stem seal at this lower point on the stem longitudinally spaced from the upper set of seal rings 15–17 provides cooperation between the stem seals in proper centering of the stem within the bore of the housing.

When the fusible material F melts sufficiently, the force of the contracted coil spring 20 pushes the stem S outwardly to the extended or expanded position of FIG. 2. In the position of FIG. 2, the stem 14 is held in the outwardly extended position by annular stem stop member 18, whose upper chamfered surface 18c is sealingly engaged against downwardly facing annular shoulder portion 10f of the bore. Even in this extended position, the annular stem sealing ring or multipurpose seal 19 continues to sealingly engage the cylindrical bore surface 10g, still preventing the entry of any cooking fluids into the bore and, perhaps more importantly, preventing the outward flow of any of the fusible material from the bore. In this manner, the stem is continuously sealed against the internal surfaces of the bore, both in the contracted and expanded positions.

This invention is directed to the detection of the attainment of a certain temperature in a meat or other environment. One particularly known usage of the Temperature Indicator of this invention is as a "turkey timer" signalling the attainment of the proper temperature within the meat of a turkey. It should be understood that the principles of this invention may be directed to other analogous and equivalent uses without departing from the intended scope of this invention.

What is claimed is:

1. A temperature indicator for indicating the attainment of a particular temperature in an object in which the temperature indicator is inserted, comprising:

a barrel which is generally cylindrical in configuration having a first open end and a second closed end, said barrel having a bore therein which is open at said first open end of said barrel;

said bore of said barrel extending substantially the length of said barrel and terminating in a closed end at said second closed end of said barrel;

a movable stem which is generally cylindrical in configuration, said stem being mounted in said barrel bore for movement between a contracted position and an extended position;

resilient means mounted in engagement with said barrel bore and said stem for urging said stem to said extended position;

said movable stem having a first end located at said first open end of said barrel bore and a second end located at said closed end of said bore with said stem in said contracted position, said first end of said stem protruding from said barrel with said stem in said extended position, said second end of said stem and said closed end of said barrel bore having space therebetween which is filled with a fusible material which is solidified below a certain particular temperature and becomes softened or melted at said particular temperature;

said resilient means moving said stem to said extended position when said fusible material becomes softened or melted;

said first end of said movable stem having at least one annular seal which extends into sealing engagement with said first open end of said barrel bore with said stem in said contracted position; and said stem having a multipurpose annular seal longitudinally spaced from said at least one annular seal sufficient distance to seal against said barrel bore when said stem is in the contracted position and when said stem is in the extended position.

2. The temperature indicator of claim 1, including:

said at least one annular seal being a first annular seal and a second annular seal, said second annular seal positioned between said first annular seal and said multipurpose annular seal in order to cooperate with said multi-purpose and said first annular seals to seal against the intrusion of said fluids and in order to provide alignment of movable stem within said barrel bore.

3. The temperature indicator of claim 2, including:

said barrel bore having a cylindrical section and an inwardly extending sealing shoulder which is engaged by said second annular seal, said sealing shoulder providing a shoulder sealing surface such that said second annular seal seals against both said cylindrical section and said inwardly extending shoulder of said bore.

4. The temperature indicator of claim 1, including:

said first end of said stem having an enlarged circular portion which makes the stem more visible when moved to said extended position, said enlarged portion being spaced from engagement with said barrel with said stem in said contracted position.

5. The temperature indicator of claim 1, including:

said closed end of said bore being conical in configuration; and said second end of said stem terminating in a rounded end portion which engages said closed end of said barrel bore with said stem in said contracted position such that said closed end of said barrel bore and said rounded end portion of said stem cooperate to properly position and align said second end of said stem in said bore.

6. A temperature indicator for cooked meats, including:

a barrel housing which is generally cylindrical in configuration and having an upper open end and a bottom closed end;

a bore of said barrel housing extending substantially the length of said barrel housing and terminating in a closed end at said bottom closed end of said barrel housing;

a movable stem which is generally cylindrical in configuration and is mounted within said barrel bore for slidable movement between a contracted position and an extended position;

resilient means engaging said barrel housing bore and said movable stem for urging said stem to extended position wherein a first end of said stem is extended out of said barrel housing bore;

said first end of said stem having at least two annular seals integrally formed therewith and extending into sealing engagement with said barrel housing bore with said stem in said contracted position;

said stem further have an annular stop member positioned on said stem below said two annular seals; and said stem further having a third annular seal postioned on said stem below said annular stop member, said third annular seal being in sealing engagement with said barrel bore with said stem in both said contracted position and said extended position.

7. The temperature indicator of claim 6, including:

said barrel housing bore having an inwardly extending stop shoulder located below said at least two annular seals of said stem; and said annular stop member on said stem including a sealing surface which engages said inwardly extending stop shoulder with said stem in said extended position to position said stem in said extended position and to provide an annular sealing area therebetween.

\* \* \* \* \*